April 12, 1955  J. L. McDERMOTT  2,705,810
VEHICLE WASHING APPARATUS AND OPERATING MEANS THEREFOR
Filed Feb. 17, 1954  2 Sheets-Sheet 1

JAMES L. McDERMOTT
INVENTOR.

BY
ATTORNEY

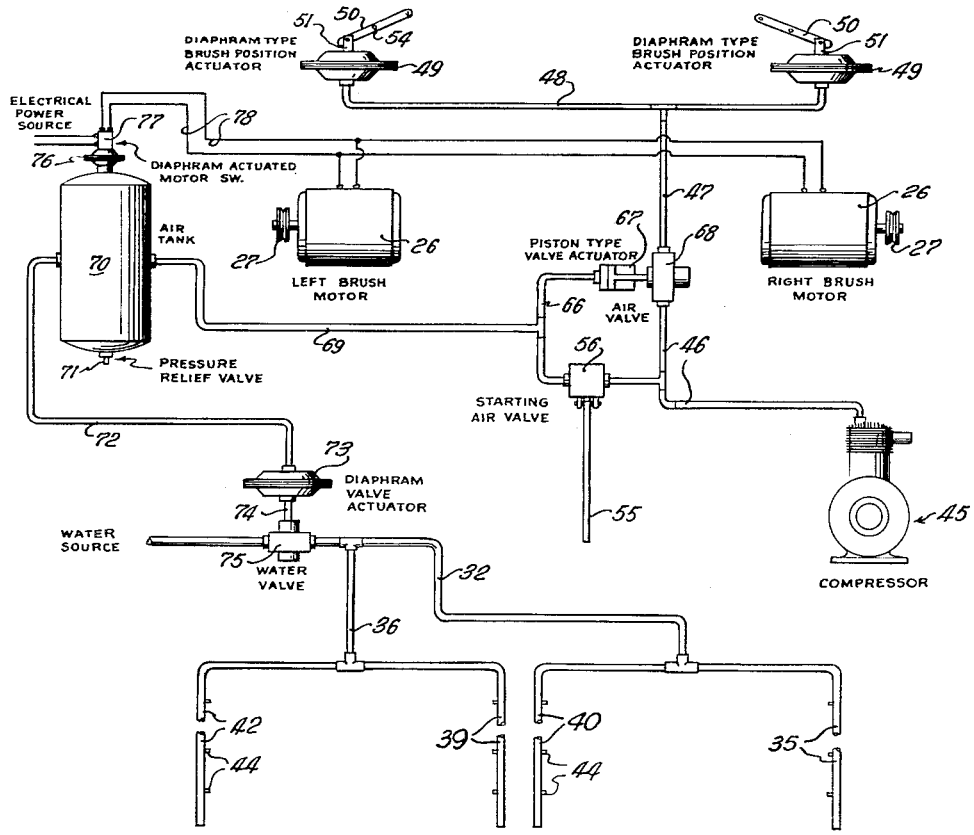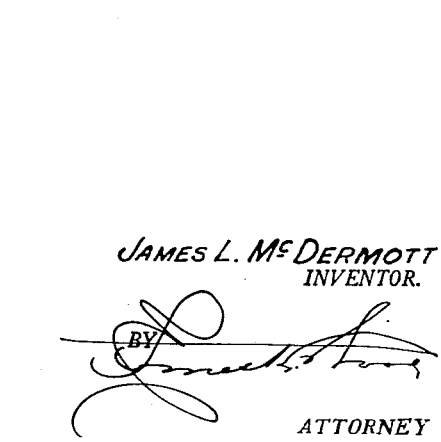

United States Patent Office

2,705,810

VEHICLE WASHING APPARATUS AND OPERATING MEANS THEREFOR

James L. McDermott, Dallas, Tex.

Application February 17, 1954, Serial No. 410,794

5 Claims. (Cl. 15—21)

This invention relates to apparatus for washing vehicles and more particularly to the type of washing apparatus employing rotary brushes and water sprays between which a vehicle is driven to scour and remove dirt and grime from the walls of a truck or trailer, as the case may be.

The principal object of the invention is to improve upon conventional equipment and methods of washing trailer-tractor combinations or other like vehicles by providing a pneumatic operating system which is normally under pressure to maintain rotary washing brushes in retracted positions through the medium of diaphragms which are deactivated by a vehicle actuated valve, releasing the brushes to the collapsing action of the diaphragms and suitable linkage to move the brushes into operative position or toward the sides of a vehicle to be washed, aided by the action of a spring interconnecting the brushes. Simultaneously, the vehicle actuated valve causes the transfer of air under pressure to an air pressure reservoir equipped with a bleeder valve and from which air is transferred to two diaphragms, one actuating a switch to energize a motor for driving the rotary brushes while the other actuates to open position a valve which controls the water supply to a series of spray heads associated with the rotary brushes. The bleeder valve is effective to maintain only enough pressure in the air reservoir for a single washing and upon depletion of pressure, the diaphragms actuated thereby collapse to de-energize the brush motor circuit and close the water valve.

Another object of the invention is to provide rotary brush standards supporting the brushes in vertical position but are inclined so that the brushes tend to move toward inoperative positions yet are restrained by counteraction of their operating diaphragms and the interconnecting spring which latter element is effective to maintain the brushes against the walls of a vehicle with substantially uniform pressure whether or not the vehicle is centered between the brush standards.

Other objects will appear as the description proceeds when considered with the annexed drawings, wherein:

Figure 3 is a diagrammatic view of the pneumatic control system, and

Figure 4 is a detail view, partly in section, showing the vehicle actuated starting valve.

Figure 1:
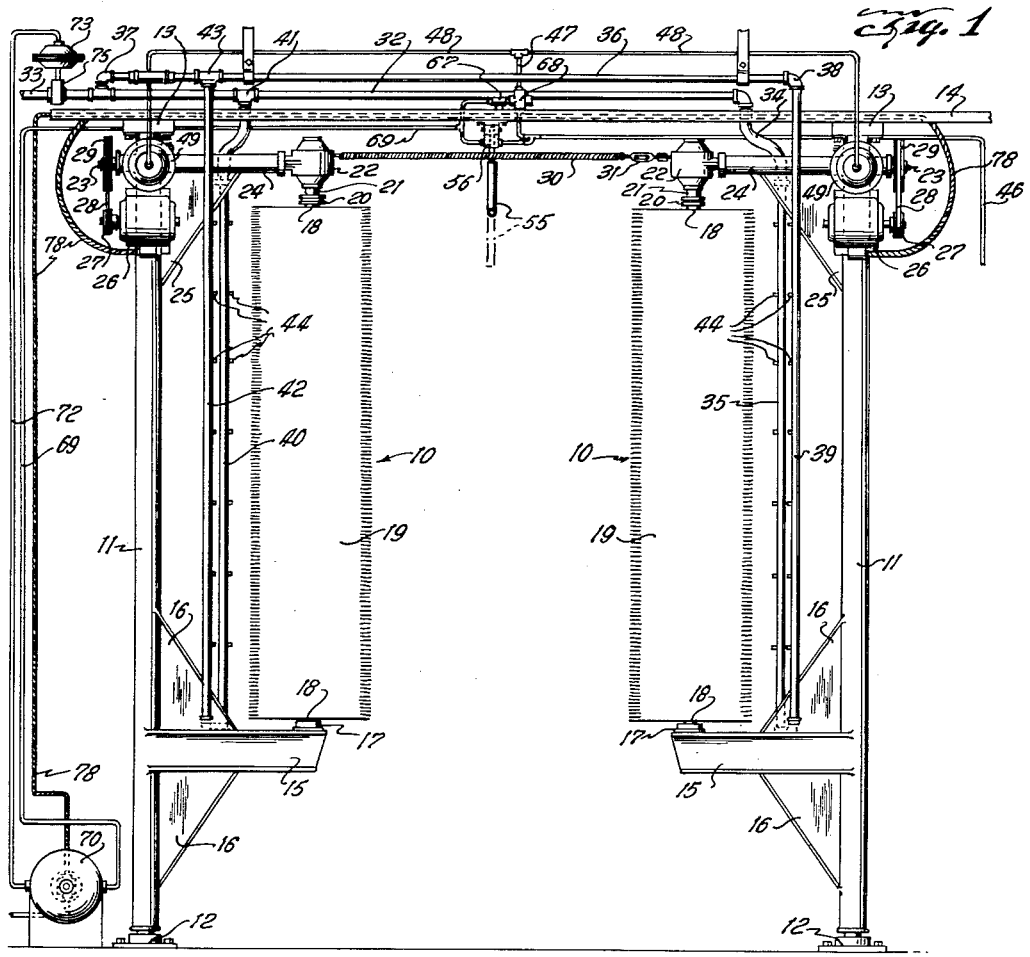
Figure 1 is a front elevational view of a vehicle washing apparatus constructed according to the invention.
Figure 2:
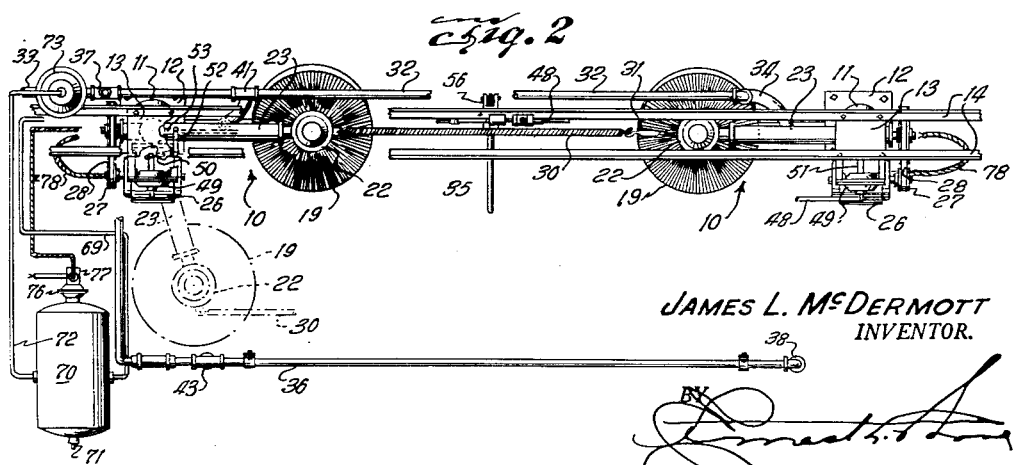
Figure 2 is a top plan view.

Continuing with a more detailed description of the drawing, reference is primarily made to Figures 1 and 2 wherein numeral 10 denotes generally each of two brush assemblies, each of which is comprised of a column or standard 11, rotatably supported at its lower end in a floor flange 12 and at its upper end in a bearing 13, carried by a cross-beam 14 which is supported from the ceiling of a building in any suitable manner. Each of the standards 11 has a lateral arm 15 affixed thereto at a point spaced above its lower end which is reinforced by brackets 16. The arm 15 carries a bearing 17 in which is journaled the lower end of a spindle 18 of a cylindrical rotary brush 19.

The upper end of the spindle 18 of each brush assembly has a coupling 20 by which the spindle is connected to a shaft 21 extending from a gear housing 22 which contains gears driven by a shaft 23 extending through a torque tube 24 which is welded or otherwise secured to the top of a triangular brace 25 which latter, in turn, is welded to the standard 11.

Each of the standards 11 is inclined slightly in a forwardly direction so that there will be a tendency for the brushes 19 to swing away from each other or toward the inoperative position. This is revealed in Figure 2 in which the floor flanges 12 are seen as being rearwardly offset in relation to the upper ends of the standards. On each standard 11 adjacent its upper end is mounted an electric motor 26 having a pulley 27 mounted on its shaft. A belt 28 engages the pulley 27 and a pulley 29 mounted on the outer end of the shaft 23. By this arrangement the motors 26 drive the brushes 19 through the pulley 27, belt 28, pulley 29, shaft 23 and gears within the housing 22 which can consist of a conventional automobile differential.

Connected at one end to one of the gear housings 22 is a coil spring 30 whose opposite end is connected to the opposite gear housing 22 through the medium of a turnbuckle 31 by which adjustment of the tension in the spring 30 is accomplished. The spring normally urges the brush assemblies toward each other and has the effect to maintain uniform pressure on the brushes whether or not a vehicle driven between the brushes is centrally disposed.

Extending across the tops of the assemblies 10 is a water pipe 32, one end 33 thereof being connected to a municipal outlet, not shown, while the opposite end has connected thereto one end of a short length of hose 34. The opposite end of the hose 34 is connected to the upper end of a water pipe 35 which is supported vertically in relative parallelism with the longitudinal axis of a brush 19 to one side thereof. A second water pipe 36 extends horizontally in parallelism with the pipe 32 forwardly thereof and is joined to the water pipe 32 at one end by means of an elbow and T fitting 37. The opposite end of pipe 36 has an elbow 38 thereon from which depends a vertical pipe 39 which is parallel with depending pipe 35 on the opposite side of one of the brushes 19. Adjacent the complementary brush 19 is a depending pipe 40 whose upper end connects to horizontal pipe 32 by means of a T 41. Parallel with the depending pipe 40 is a companion vertical pipe 42 whose upper end is connected by means of a T 43 to the horizontal pipe 36. Each of the four depending pipes 35, 39, 40 and 42 is equipped with a series of vertically spaced spray heads 44 which are adapted to direct streams of water under pressure against the side walls of a vehicle passing between the brush assemblies 10 on each side of each brush 19 while the brushes revolve, to impose a scrubbing or scouring action on the said walls.

In Figures 3 and 4 is illustrated the pneumatic system by which the brush assemblies 10 are automatically and simultaneously actuated. An air compressor 45 supplies air pressure through pipes 46, 47 and 48 to a pair of air brake type diaphragms 49, one of which serves each of the brush assemblies 10 and are of identical construction. These diaphragms are under pressure at all times except when a vehicle is being washed, hence the brushes 19 are held in retracted positions shown in dotted lines in Figure 2. This is accomplished through the medium of a lever 50, one end of which is pivoted to a plunger 51 of the diaphragm 49 while the opposite end of the lever is pivoted to one end of a link 52 (Figure 2) whose opposite end is pivoted to an arm 53. The arm 53 is rigidly secured to the upper end of a standard 11 and the lever 50 is pivoted at 54 (Figure 3) to one of the horizontal supporting beams 14.

From the foregoing, it is evident that pressure of air through pipes 46, 47 and 48 will expand the diaphragms 49, causing the lever 50 to rock on its pivot 54, thus placing the link 52 under tension to exert a pull on arm 53, causing the standard 11 to rotate to move the brush 19 carried thereby toward the inoperative or retracted position shown in dotted lines in Figure 2. This action is against the resistance of the coil spring 30.

The brush assemblies 10 are held by the diaphragms 49 in retracted positions until a vehicle is driven to a point where a depending flexible member such as a length of hose 55 engages the top of the vehicle, such as a trailer. When the occurs, a starting air valve 56 (Figure 4) is actuated by the hose 55 to open position. The hose contains a length of coil spring 57 at the point where its end is connected to an arm 58 to stiffen the same. The arm 58 is pivoted between a pair of ears 59 which are rigid with the valve body 60 and abutting the arm is a plunger 60a on which is a valve 61 movable in relation to a seat 62 within the valve body 60. A coil spring 63 bears at one end against a threaded plug 64 in the valve body and at its opposite end against a flange 65 on the plunger 60a, thus to bias the valve 61 toward closed position.

When the valve actuating hose is displaced inwardly, as above mentioned, the valve 61 is unseated, permitting air to flow from pipe 46 into pipe 66 and a piston type valve actuator 67 to close a valve 68 through which communicates the pipes 46 and 47 to the brush assembly diaphragms 49. The diaphragms 69, being thus deprived of air, collapse, causing the lever 50 to pivot in the opposite direction, placing the link 52 under compression and thus rotate the standards 11 to move the brushes 19 inwardly toward operative position for engagement with the side walls of the vehicle about to pass therebetween.

Simultaneously with the above described action, air from pipe 66 (Figure 3) will pass into and through a pipe 69 into a tank 70. The tank 70, referred to previously as the air pressure reservoir, is equipped with a bleeder or relief valve 71 which is of conventional manufacture and can be set to open at any given pressure. Further reference to this feature of the invention will be made presently.

Communicating with the tank 70 is another pipe 72 which extends to and operates a diaphragm 73. The diaphragm 73 has a plunger 74 (Figure 3) which actuates a water valve 75 in the main water pipe 32. Therefore, when there is sufficient air pressure in the tank 70 to actuate the diaphragm 73, the valve 75 is opened, releasing water into all of the depending spray pipes 35, 39, 40 and 42. At the same time the valve 75 is opened, air pressure from tank 70 enters another diaphragm 76 shown on the top of the tank for clarity, and which contains an electric switch 77 connected in a motor circuit 78, serving the two brush operating motors 26, previously referred to.

In operating the invention, a truck, tractor-trailer or other vehicle is driven toward the brush assemblies which are in the retracted position shown in dotted lines in Figure 2, held so by the diaphragms 49. As the top front of the vehicle engages the depending hose 55, starting valve 56 closes valve 68 through the medium of the valve actuator 67 to suspend passage of air to the diaphragms 49. The diaphragms act to move the brush assemblies toward their operative positions, as shown in solid lines through the action of the lever 50, link 52 and rigid arm 53. Simultaneously, the air released into pipe 69 through the now open valve 56 enters the tank 70, raising the pressure therein to actuate both diaphragms 73 and 76 to respectively open the water valve 75 and close the circuit 78 to motors 26 at the same time. Accordingly, the brushes 19 will begin rotating and the spray head 44 will begin functioning to clean the vehicle sidewalls of accumulated dirt and road grime.

When the vehicle emerges from between the brush assemblies the hose 55 will drop off the rear end of the vehicle causing the valve 56 to close, suspending flow of air to the tank 70 but restoring air to the diaphragms 49. The expanding diaphragms will return the brush assemblies 10 to retracted or inoperative positions. Meanwhile, the relief valve 71 of the tank 70 which has been previously set to operate at a predetermined pressure, will open to release air from the tank 70 until the diaphragms 73 and 76 collapse whereupon the water valve 75 will close and the switch 77 will open the brush motor circuit 78, stopping the motors and consequently the brushes.

Manifestly, the construction as shown and described is capable of some modification and such modification as may be construed to fall within the scope and meaning of the appended claims is also considered to be within the spirit and intent of the invention.

What is claimed is:

1. In a vehicle washing apparatus, a pair of parallel oscillatable brush supporting standards between which a vehicle is driven while being washed, each standard including, a lateral arm carried by the lower end of said standard, a torque tube supported on the top of said standard in parallelism with said arm, a driving shaft in said torque tube, a gear assembly operated by said shaft, a rotary brush having its lower end journaled in the end of said arm and its upper end engaged with said gear assembly, a coil spring connected at its ends to said gear assemblies to normally urge said brushes toward operative positions, a motor circuit, a driving motor in said circuit for each of said brushes, a water supply system comprising pipes disposed horizontally above said brushes, two pairs of spray pipes depending from said horizontal pipes, one on each side of each of said brushes, a pneumatically actuated diaphragm and linkage assembly for each of said brushes normally urging said brushes to inoperative position, an air tank, an air conduit leading from an air source to said tank and to said pneumatically actuated diaphragms, a diaphragm actuated switch in said motor circuit, means connecting said switch diaphragm to said air tank, a diaphragm actuated valve controlling flow of water to said spray pipes, means connecting said air tank to the diaphragm of said latter valve, a vehicle actuated valve interrupting air pressure to said pneumatically actuated diaphragms but effective to charge said air tank with air from said source to actuate said switch and water valve simultaneously to release said brush standards to the action of said coil spring and to release water into said spray pipes, means effective upon release of said vehicle actuated valve to restore said brushes to inoperative position through said pneumatically actuated diaphragms and their linkage assemblies and means for releasing air from said air tank above a predetermined pressure to close said water valve and switch through their respective diaphragms.

2. In a vehicle washing apparatus, a pair of parallel oscillatable brush supporting standards between which a vehicle is driven while being washed, a rotary brush supported in vertical position on each of said standards, a coil spring connected at its ends between said brushes to normally urge said brushes toward operative positions against the sides of a vehicle passing therebetween, a motor circuit, a driving motor in said circuit for each of said brushes, a water supply system comprising pipes disposed horizontally above said brushes, spray pipes depending from said horizontal pipes, one on each side of each of said brushes, a pneumatically actuated diaphragm and linkage assembly for each of said brushes normally urging said brushes to inoperative position, an air tank, an air conduit leading from an air source to said tank and to said pneumatically actuated diaphragms, a diaphragm actuated switch in said motor circuit, means connecting said switch diaphragm to said air tank, a diaphragm actuated valve controlling flow of water to said spray pipes, means connecting said air tank to the diaphragm of said latter valve, a vehicle actuated valve interrupting air pressure to said pneumatically actuated diaphragms but effective to charge said air tank with air from said source to actuate said switch and water valve simultaneously to release said brush standards to the action of said coil spring and to release water into said spray pipes, means effective upon release of said vehicle actuated valve to restore said brushes to inoperative position through said pneumatically actuated diaphragms and their linkage assemblies and means for releasing air from said air tank above a predetermined pressure to close said water valve and switch through their respective diaphragms.

3. In a vehicle washing apparatus comprised of a pair of parallel oscillatable brush supporting standards between which a vehicle is driven while being washed, an operating mechanism comprising a rotary brush supported in vertical position on each of said standards, means normally biasing said brushes toward operative positions against the sides of a vehicle passing therebetween, a motor circuit, a driving motor in said circuit for each of said brushes, a water supply system including spray pipes depending from said supply system, into parallelism with each side of each of said brushes, a pneumatically actuated diaphragm and linkage assembly for each of said brushes normally urging said brushes to retracted position, an air tank, an air conduit leading from an air source to said tank and to said pneumatically actuated diaphragms, a diaphragm actuated switch in said motor circuit, means effecting communication between said switch diaphragm and said air tank, a diaphragm actuated valve controlling flow of water to said spray pipes, means connecting said air tank to the diaphragm of said latter valve, a vehicle actuated valve interrupting air pressure to said pneumatically actuated diaphragms but effective to simultaneously charge said air tank with air from said source to actuate said switch and water valve simultaneously to release said brush standards to the action of said biasing means and to release water into said spray pipes, means effective upon release of said vehicle actuated valve to restore said brushes to inoperative position against the action of their biasing means through said pneumatically actuated diaphragms and their linkage assemblies and means for releasing air from said air tank above a predetermined pressure to close said water valve and switch through their respective diaphragms.

4. In a vehicle washing apparatus having vertically mounted cylindrical brushes for rotatably engaging the sides of a vehicle driven therebetween, an operating mechanism for said apparatus comprising a motor circuit, a motor in said circuit for driving each of said brushes, a pneumatic diaphragm and linkage assembly for each of said brushes, an air reservoir and a source of air under pressure connected to said reservoir and to said diaphragms, an air valve controlling passage of air to said diaphragms to hold said brushes in retracted positions through their linkage assemblies, means normally biasing said brushes toward operative positions against the action of said linkage assemblies, a water supply line, spray pipes depending from said supply line on each side of each of said brushes, a water valve in said supply line feeding said spray pipes, air actuated means in communication with said air reservoir for opening and closing said water valve, a switch in said motor circuit, air actuated means in communication with said air reservoir for opening and closing said switch to energize and de-energize said motor circuit, a vehicle operated valve for closing said air valve to said pneumatic diaphragm to release said brushes to the action of their biasing means and to simultaneously cause air to flow from said air source to said reservoir to actuate said water valve and switch through their respective air actuated means to respectively introduce water into said spray pipes and to start said motors.

5. The structure of claim 4, and means bleeding said air reservoir of air above a predetermined pressure upon release of said vehicle actuated valve to restore air pressure to said diaphragms to retract said brushes and to de-activate said water valve and switch.

References Cited in the file of this patent

UNITED STATES PATENTS

| | | |
|---|---|---|
| 2,242,692 | Yingling | May 20, 1941 |
| 2,579,866 | Rousseau | Dec. 25, 1951 |